Patented Aug. 1, 1933

1,920,829

UNITED STATES PATENT OFFICE 1,920,829

MANUFACTURE OF BASIC DYESTUFFS

Max Wyler, Manchester, England, assignor to Imperial Chemical Industries Limited, a Corporation of Great Britain No Drawing. Application June 24, 1930, Serial No. 463,569, and in Great Britain June 27, 1929

7 Claims. (Cl. 260—63)

This invention relates to the manufacture of dyestuffs of the rhodamine series.

By this invention valuable new dyestuffs distinguished by brightness of shade and good solubility are made by condensing in the presence of an appropriate agent, e. g. sulphuric acid, the aminoxylenol (OH:NH2:CH3:CH3=1:3:2:4), i. e. 2-amino-m-4-xylenol, with a 4-dialkylamino-2-hydroxybenzophenone-2'-carboxylic acid, followed by esterification of the free carboxyl group. The preparation of this aminoxylenol is described in my companion application Ser. No. 463,568.

For the purpose of my invention it is not necessary that the free aminoxylenol be used. I may use, e. g. the acetyl derivative, since the acetyl group is removed by the action of the acid which serves as condensing agent.

The dyeings obtained by the new dyestuffs are distinguished by brightness of shade, which is particularly evident in the pigment obtained when the dyestuffs are compared with complex inorganic acids, such as phosphotungstic acid.

My invention is illustrated, but not limited, by the following example, in which the parts are by weight.

Example 23 parts 4-diethylamino-2-hydroxybenzophenone-2'-carboxylic acid (o-4-diethylamine-2-hydroxybenzoylbenzoic acid) of the constitution

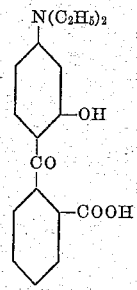

melting at 203° C., 12½ parts of the above mentioned aminoxylenol and 125 parts 80% sulphuric acid are heated for 4 hours at 140° C.

The reaction mixture is then diluted with 1000 parts water and allowed to crystallize. After crystallization is complete the product is filtered off and dried. It is mixed with 100 parts ethyl alcohol boiled under reflux and a current of hydrochloric acid gas passed through the liquid for several hours. The alcohol is distilled off, the residue dissolved in 800 parts hot water, filtered and allowed to crystallize. The esterified rhodamine separates out in beautiful crystals with green reflex which dye tannin mordanted cotton a very bright bluish red.

The dye made according to the example separates in the form of its hydrochloride and probably has the structural formula

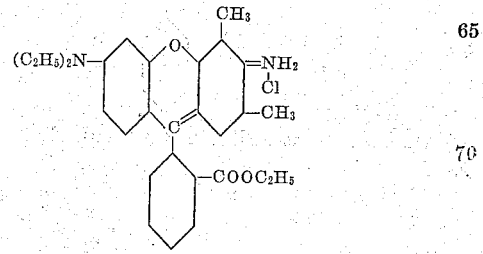

By substituting o-4-diethylamino-2-hydroxybenzoylbenzoic acid by the monoethyl or dimethyl body, products of similar properties are obtained. The same result is obtained if the aminoxylenol is substituted by the equivalent amount of acetylaminoxylenol.

These dyes may be applied to tannin mordanted cotton, and to wool and to cellulose esters and ethers, for instance, acetate rayon.

As many apparent and widely different embodiments of this invention may be made without departing from the spirit thereof, it is to be understood that I do not limit myself to the foregoing examples or description except as indicated in the following claims.

I claim:

1. The process of producing a new dye of the rhodamine series which comprises condensing a compound of the group consisting of 2-amino-m-4-xylenol and its acetyl derivatives with a 4-alkylamino-2-hydroxybenzophenone-2'-carboxylic acid and thereafter effecting esterification of the free carboxyl group of the condensate.

2. The process of producing a new dye of the rhodamine series which comprises condensing a compound of the group consisting of 2-amino-m-4-xylenol and its acetyl derivatives with a 4-alkylamino-2-hydroxybenzophenone-2'-carboxylic acid and reacting the condensate with ethyl alcohol in the presence of hydrochloric acid.

3. The process of producing a new dye of the rhodamine series which comprises condensing a compound of the group consisting of 2-amino-m-4-xylenol and its acetyl derivative with an alkylamino-2-hydroxybenzophenone-2'-carboxylic acid and thereafter effecting esterification of the free carboxyl groups of the condensate.

4. The process of producing a new dye of the rhodamine series which comprises condensing a compound of the group consisting of 2-amino-m-4-xylenol and its acetyl derivatives with a 4-alkylamino-2-hydroxybenzophenone-2'-carboxylic acid of the class consisting of mono- and diethyl and mono- and di-methyl amino compounds and reacting the condensate with ethyl alcohol in the presence of hydrochloric acid.

5. The process of producing a new dye of the rhodamine series which comprises condensing 23 parts of 4-diethyl-2-hydroxy-benzophenone-2'-carboxylic acid with about 12½ parts of 2-amino-m-4-xylenol, separating the condensate and reacting it with about 100 parts of ethyl alcohol under conditions adapted to effect esterification.

6. A product having the probable formula in the form of its hydrochloride

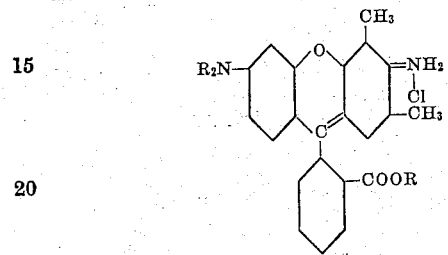

where R equals alkyl and obtainable by condensing an amino-xylenol compound with a 4-alkylamino - 2-hydroxybenzophenone - 2' - carboxylic acid and thereafter effecting esterification of the free carboxyl group of the condensate.

7. A product having the probable formula in the form of its hydrochloride

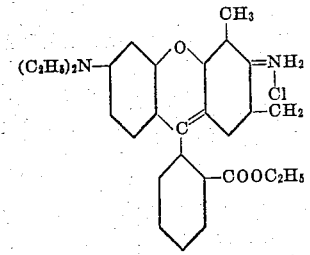

and obtainable by condensing 23 parts of 4-diethyl-amino -2 -hydroxybenzophenone - 2' - carboxylic acid with about 12½ parts of 2-amino-m-4-xylenol, separating the condensate and reacting it with about 100 parts of ethyl alcohol under conditions adapted to effect esterification.

MAX WYLER.